(12) United States Patent
Harris

(10) Patent No.: US 7,321,785 B2
(45) Date of Patent: Jan. 22, 2008

(54) EYEGLASSES WITH WIRELESS AUDIO CAPABILITY

(76) Inventor: Scott C. Harris, P.O. Box 927649, San Diego, CA (US) 92192

( * ) Notice: Subject to any disclaimer, the term of this patent is extended or adjusted under 35 U.S.C. 154(b) by 0 days.

(21) Appl. No.: 11/260,022

(22) Filed: Oct. 26, 2005

(65) Prior Publication Data
US 2006/0052136 A1 Mar. 9, 2006

Related U.S. Application Data

(63) Continuation of application No. 10/064,711, filed on Aug. 8, 2002, now abandoned.

(51) Int. Cl.
H04B 1/38 (2006.01)
H04M 1/00 (2006.01)

(52) U.S. Cl. .................. 455/557; 455/43; 455/100; 455/344; 455/349; 455/351; 455/575.1; 455/576.6; 455/456; 381/24; 381/187; 381/205; 343/702

(58) Field of Classification Search ............ 455/576.6, 455/456, 575.1, 100, 43, 344, 349, 351, 575; 381/24, 187, 205; 343/702
See application file for complete search history.

(56) References Cited

U.S. PATENT DOCUMENTS

| 4,856,086 A * | 8/1989 | McCullough ............... 455/344 |
| 5,337,044 A | 8/1994 | Folger et al. |
| 5,367,345 A * | 11/1994 | da Silva ..................... 351/123 |
| 5,563,951 A * | 10/1996 | Wang et al. ................ 381/301 |
| 5,646,605 A | 7/1997 | Leonaggeo et al. |
| 5,844,824 A * | 12/1998 | Newman et al. ............ 345/156 |
| 5,884,198 A * | 3/1999 | Kese et al. ............. 455/575.6 |
| 6,041,243 A * | 3/2000 | Davidson et al. ........ 455/575.1 |
| 6,091,546 A * | 7/2000 | Spitzer ....................... 359/618 |
| 6,091,808 A | 7/2000 | Wood et al. |
| 6,101,256 A * | 8/2000 | Steelman ..................... 381/91 |
| 6,108,411 A | 8/2000 | Otsuka et al. |
| 6,122,351 A | 9/2000 | Schlueter et al. |
| 6,157,705 A | 12/2000 | Perrone |
| 6,211,858 B1 | 4/2001 | Moon et al. |
| 6,243,870 B1 * | 6/2001 | Graber ............................ 2/69 |
| 6,285,747 B1 | 9/2001 | Haack |
| 6,324,053 B1 * | 11/2001 | Kamijo ....................... 361/683 |
| 6,377,927 B1 | 4/2002 | Loghmani et al. |
| 6,509,913 B2 | 1/2003 | Martin et al. |
| 6,512,415 B1 | 1/2003 | Katz |
| 6,577,499 B1 * | 6/2003 | Choi .......................... 361/683 |
| 6,577,861 B2 | 6/2003 | Ogasawara |
| 6,714,641 B2 | 3/2004 | Kredo et al. |
| 6,798,391 B2 * | 9/2004 | Peterson, III .................. 345/8 |
| 6,895,261 B1 * | 5/2005 | Palamides ................ 455/575.6 |
| 2003/0122655 A1 * | 7/2003 | Hum et al. ................. 340/10.3 |

* cited by examiner

Primary Examiner—Steve M. D'Agosta

(57) ABSTRACT

A cellular telephone is used as a remote control device to control operations on the users nonportable computer which is remote location to the cellular telephone. The user can carry out various operations on the cellular telephone which cause the remote computer to take some additional action.

1 Claim, 12 Drawing Sheets

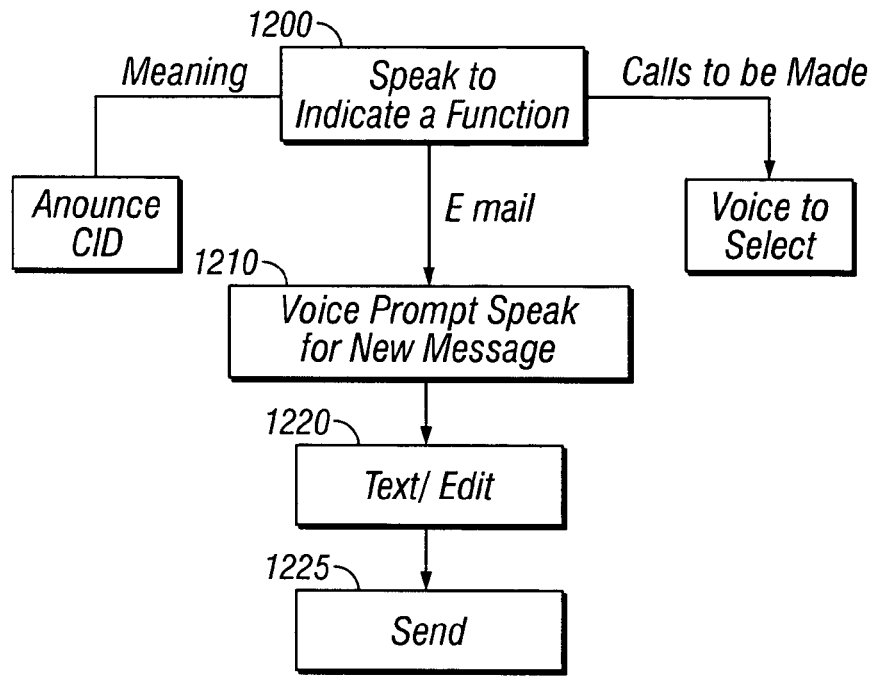
FIG. 12
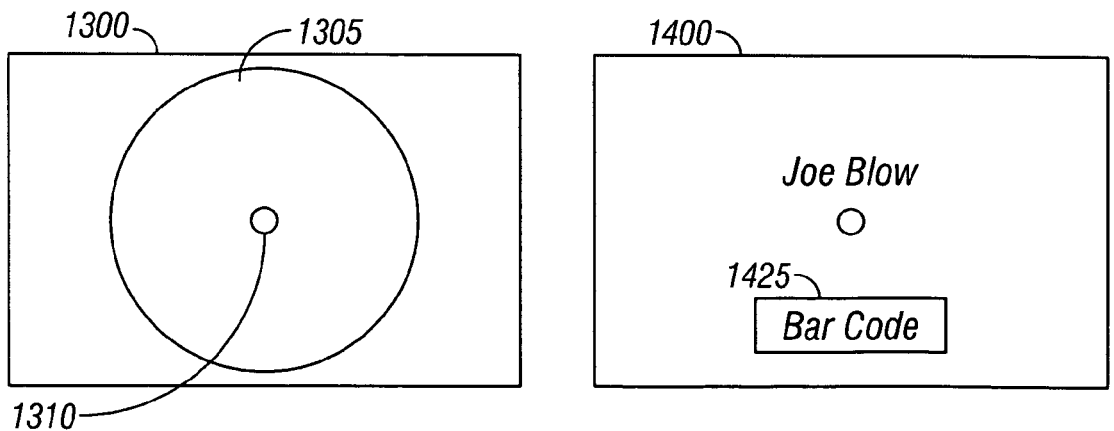
FIG. 13     FIG. 14

EYEGLASSES WITH WIRELESS AUDIO CAPABILITY

This application is a continuation of U.S. application Ser. No. 10/064,711 filed Aug. 8, 2002 now abandoned.

BACKGROUND

Modern cordless phones often have the ability to detect their own position. For example, cellular phones are being produced with satellite positioning technology that automatically senses a position of a telephone. Phones using the wireless applications protocol or "wap" can be monitored in a similar way. A position of a cellular phone can also be determined by triangulating between multiple base stations which are communicating to the phone.

SUMMARY

The present application teaches a plurality of applications for cordless phones. A number of these applications include operations that are based on sensing the position of the phone and storing and/or obtaining information about the possessor of the phone at that position.

One application is a game for a wireless phone that is based on the user's position. Another application is a friend and dating service that is based on the user's position.

Another application is an online manager which uses a thin client on the phone to obtain information from another computer that is located elsewhere.

Another application is a remote desktop control.

Clothing that includes telephone functionality is also disclosed.

The present application teaches a system of combining portable telephony with other functions. One such combination combines a portable telephone with clothing associated with the portable telephone to provide "wired fashion" for users. Another disclosed system describes remote access art, in which art is accessed from a remote location.

BRIEF DESCRIPTION OF THE DRAWINGS

These and other aspects will now be described in detail with reference to the accompanying drawings, wherein:

FIG. 12 shows a flowchart of operation;

FIG. 13 shows a cross-section of a CD card;

FIG. 14 shows a front portion of the CD card with a bar code;

DETAILED DESCRIPTION

Figure 1:
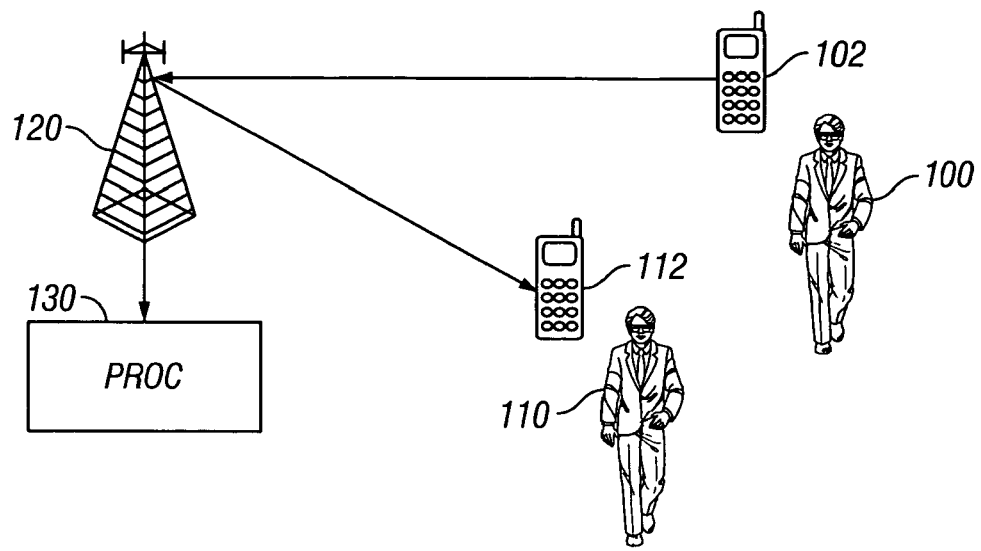
FIG. 1 shows a basic operation of a wireless position sensing phone.

A basic operation of a phone system with position detection is shown in FIG. 1. A user 100 has a phone 102. The phone 102 communicates with the base station 120. A processor 130 within the base station 120 automatically finds the position of phone 102. Similarly, a user 110 has a phone 112. The position of phone 112 is also found by the processor 130. Many more users could be similarly provided, and in fact the number of users is limited only by the limits of the cellular phone system.

The processor 130 can run a program either alone or in conjunction with the phones 102, 112. In modern cellular phones, the processor 130 in the base station can act as a server for the client in phone 102.

Figure 2:
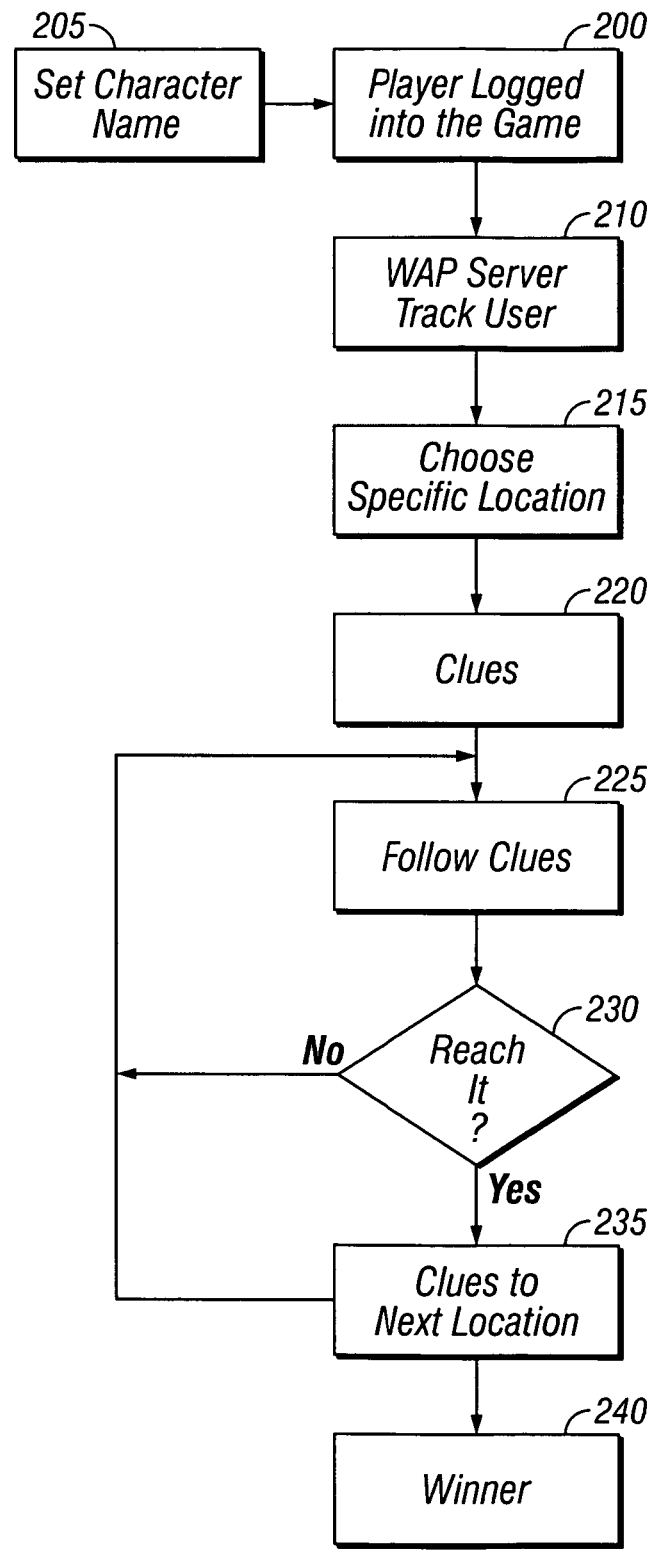
FIG. 2 shows a flowchart of operation of a game being played on such a phone.

A first embodiment operates by running the flowchart shown in FIG. 2. In this flowchart, a special game is played which uses the power of the position sensing phone such as a WAP phone.

The game is based on information stored in the server. The server can be associated with a number of different websites including telephone company sites such as Telstra.com. The game can also be associated with a number of other sites, as described herein.

At 200, the player initiates their entry into the game by logging in. According to one revenue model, all players will be charged a fee for entering the game. Another revenue model may simply charge the players for connection time during the time that they are playing the game. After the player logs into the game at 202, the player sets character information at 205. The character information may include a character name or other alias which the user will use. The player also selects a location or area in which they wish to play. This location/area may be selectable from a menu. Users log on within a specified time period. The game is played against those people who login within that same period.

In summary, the game provides clues on the user's WAP phone. The user may use those clues to find specified locations. The user's position in time and space is monitored. The clues given by the system are based on the user's position. Responses to the clues can be monitored by location tracking. The clues lead the user to a final location. When the user enters the destination location, the user received a prize or points or some other kind of reward.

Each player is constantly tracked 210 by the server after log in, so that their profile and physical location can continue to be monitored.

Each group of players is provided with clues about their actual surroundings at 220. The clues drive the user to follow the clues at 225, and drive the WAP server to monitor the users to determine their success at following the clues. When the user solves the clues, they move from a current physical position to the next physical position. At 230, the user reaches a destination position. The user is then given clues to the next location at 235.

Any of the destinations may be a way station or may be a final location. Each destination may be a store or trader of some type. The destination may be a sponsor of the game or simply a store that desires to get traffic from a specified profile of user. For instance, a store may register its desire to get more 20 to 25-year-old persons into the store using the clues. The WAP server then tracks the users and drives those users with the specified profile into that specified store. By going into the store, the user is signified as reaching the destination location at 230. The server provides clues 235 to the next location. An additional aspect provides additional clues as an incentive when the user makes a purchase at one of the waystation stores.

Figure 3:
FIG. 3 shows how clues are provided for the game shown in the flowchart of FIG. 3.

The user receives clues to the next location at 235. As in previous clues, the clue is displayed on the mobile phone as shown in FIG. 3. The user follows the clues, until reaching the desired location. At 240, the first user to reach the desired location is established as the winner. The winner receives either a prize or specified kinds of points. For example, the winning user may receive movie tickets.

Once a week, a grand playoff may be played in which all the winners from the previous week and/or from a previous location may compete against one another. Sponsors may sponsor the grand playoff, for example. Weekly, monthly and other winners may be entered into Hall of Fame, or may receive even more prizes. All inducements allow more people to enter the game.

While the above has described a specific game, it is contemplated that other location-based games may be played using the WAP phone. Each of these may enjoy a revenue model based on the airtime or based on advertising.

Figure 4:
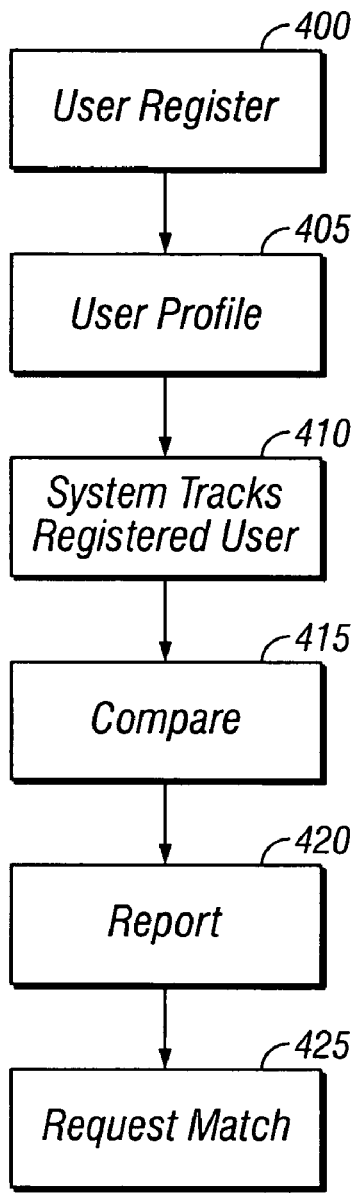
FIG. 4 shows a flowchart of operation for a dating service.

Another embodiment also makes use of the WAP phone's ability to monitor a person's position. This embodiment, shown in the flowchart of FIG. 4, allows a dating or friends service that monitors the user's position.

At 400, a user registers for the dating service. The registration may be a cash registration for a period of time, or may be a one time registration or any other kind of registration. The user must enter their profile the first time they register. The profile includes certain characteristics which enable determining matches with others. Matches may include the profile of the person, a profile of the partner that the person would like to meet; a general location of the user, i.e. where the user lives or works; a type of liaison, e.g. whether it casual, permanent or any other type; an amount of necessary agreement with the requested type before acceptance; times and dates; the WAP phone number; and a location-based-match or general match. The location-based-match will cause a different kind of acceptance than the general match.

The profile may be changed at any time by the registered user. This enables the user to enter a new profile during a vacation or the like. At all times, the system tracks all registered users shown as 410. The users within each general vicinity are compared with one another based on the profiles they enter. When there is a general match, the system contacts the users via e-mail. The users then work through a series of screens to make sure that each of them desire the specific introduction to be made. Both users must find a match before an introduction is made.

If a location match is selected, many of the other criteria may be relaxed. This means, a lower agreement score is necessary when the parties are within a specified distance, e.g. 101 or 100 meters, of one another.

Figure 5:
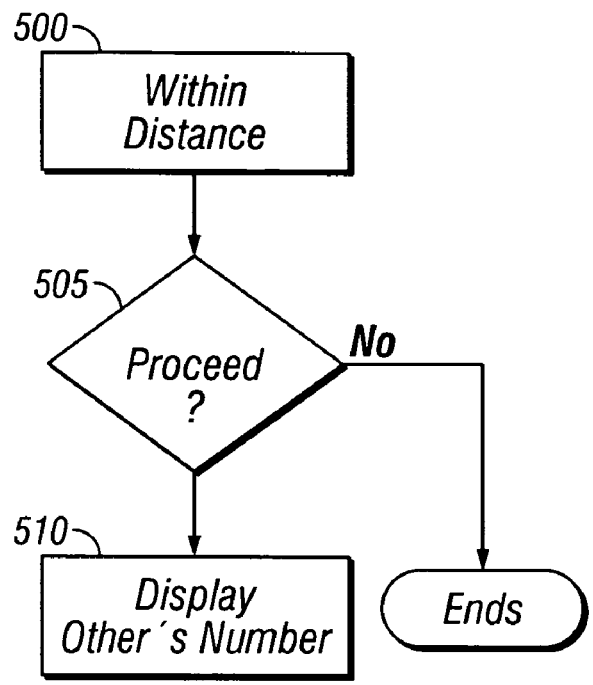
FIG. 5 shows a flowchart of operation of the dating service.

The specific operation is shown in the flowchart of FIG. 5. At 500, the system determines that two parties are within a specified distance of one another. Both parties are asked whether they want to proceed at 505. If either says no, then the process ends. The query about whether to proceed may include sending profiles of each party to the other. This may allow both users to see the others profile before deciding whether to proceed. If both signify a desire to proceed at 505, then the potential partners' phone numbers are displayed on each other's phones at 510. One of the users may then phone the other using the displayed number, and then introducing themselves. In this way, when in the location mode, location becomes the primary determining priority.

Figure 6:
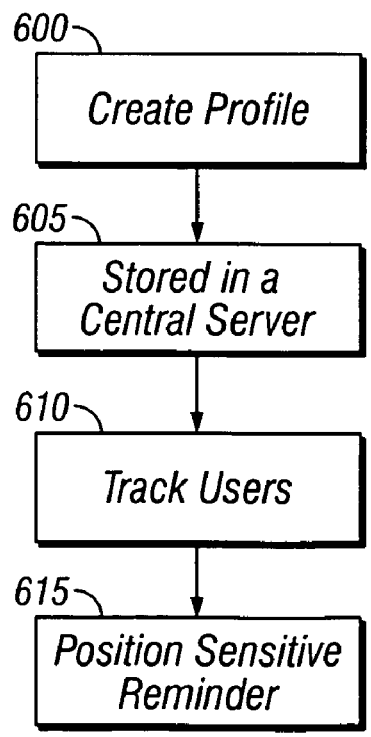
FIG. 6 shows profile and tracking for position sensitive reminder services.

Another embodiment provides an online manager using position sensing technology. Many different users have many different things that they need to do at anytime. The WAP technology can help them to these things in more sensible order. A flowchart of the operation is shown in FIG. 6. The WAP technology produces a profile of the user at 600. This profile may be supplemented over time, but includes the different things that the user wants to manage, for example, the profile may include birthdays; anniversaries; favorite movie stars; favorite foods and restaurants; work related information; book information; hobbies and the like. The profile created at 605 is stored in the central server e.g. on the telco's site. The user can access this at any time and change profiles. The user may add birthdays, delete birthdays and change the other information that the user might want to change.

At 605, the system tracks the user's movements. By tracking the movements, the system can remind the user via their WAP phone about different things that are happening in their life and different interactions between their present movements and things that are going to happen. This position sensitive reminder can take the following forms. For example, a specified birthday may be coming up within two to three days. A present can be selected e.g. flowers, and the WAP phone can detect that the WAP phone user is currently in an area where they could obtain flowers. The phone then the reminds the user about the upcoming appointment, and suggests that the user buy those flowers. Other more, common applications may include appointments coming up, traffic in the area of the upcoming appointment, downloadable profiles of the company that the person is about to meet. This may be especially advantageous since the manager knows the appointment data, and can download the profile from the Internet. The user may be reminded of the upcoming birthday. By adding sponsors to this system, additional revenue may be obtained. The manager may therefore indicate a special or sale at its particular shop that is close by. For birthday or other special occasions, the manager may pre-book flowers for the wife or significant other. The manager can also monitors stock at stores, and indicates when a favorite book or the like has arrived at a specified bookstore. When the user gets close to the specified bookstore, the system can indicate that the book has arrived. When the user wants to go to a movie, the manager can pre-book the movie ticket and also find the closest theater where the movie is playing. All of these position sensitive reminders can be included. By following the user, the manager can second-guess the user's actions as he passes specified landmarks.

Figure 8:
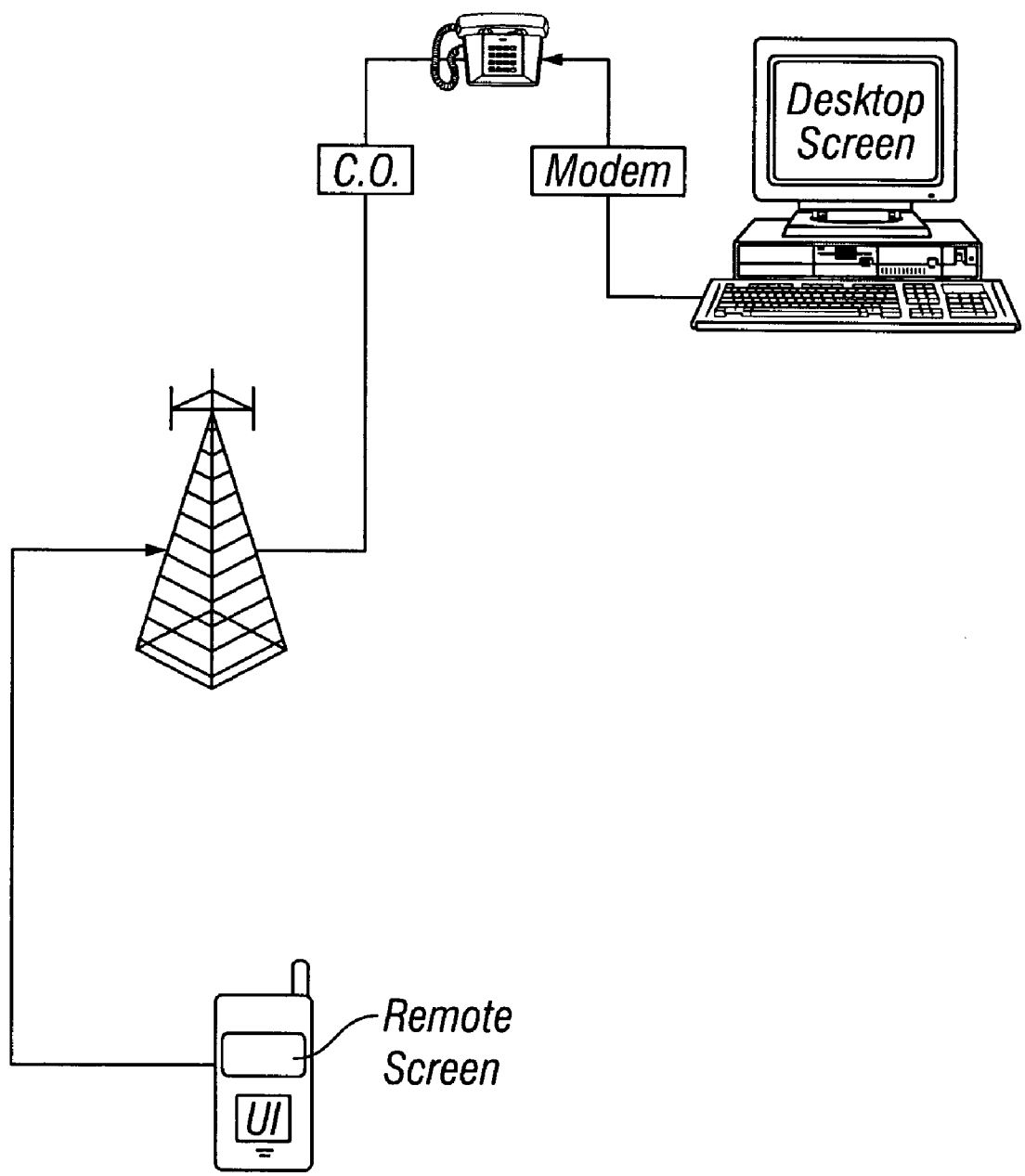
FIG. 8 shows a diagram of how the phone is used as the remote desktop.

Another aspect, shown in FIG. 8, allows a WAP phone to be used for remote desktop control. One problem facing business people and others is the need to connect remotely and send large files from one place to another. This may be particularly important for small office home office (SoHo) operators. Thin clients are known such as small personal digital assistants (PDAs) or other handheld computing devices. However, the functionality of these devices is often limited.

The present application uses a telephone as a controller or for another computer. The mobile phone connects to either the personal computer that is connected to the remote information line, or to a central server where various data is stored.

FIG. 8 shows the remote desktop control operation. A remote desktop screen is shown on the portable phone. This allows accessing the hard drive and other network drives on the dialed-in computer. All of this can be activated via voice or any other user interface. Any file on the dialed-in computer can be executed and/or sent to any other location. In essence, the dialed-in computer becomes the server controlled through the thin client phone.

Figure 7:
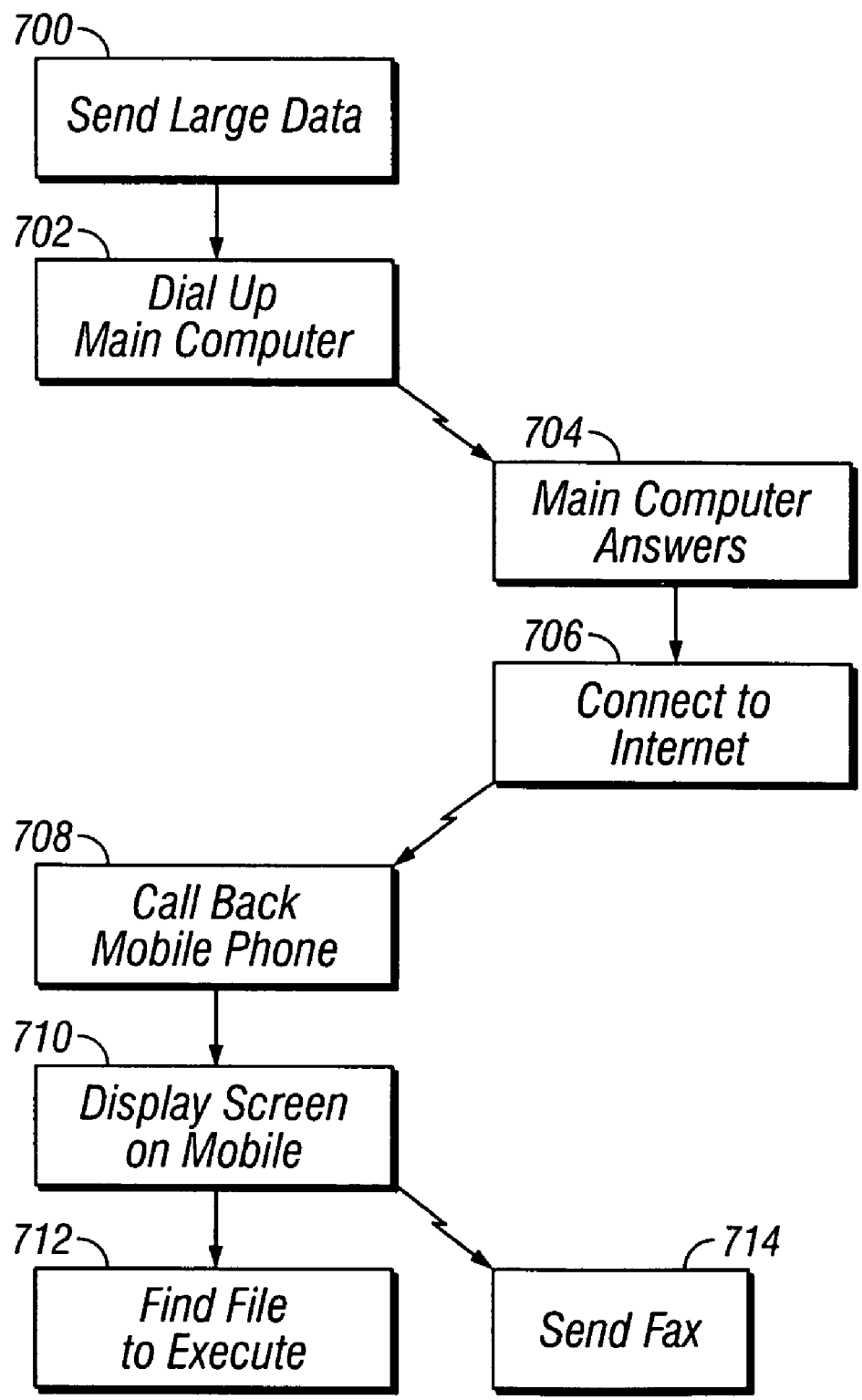
FIG. 7 shows a system for using the phone as a remote desktop.

This operation is illustrated in FIG. 7. For all of these operations, the remote computer and, either the user's personal computer or some remote information server must be left powered on. At 700, a person at a remote site realizes that they need to send a large file or e-mail with large attachment to another party—something that could be impractical if done from the phone. At 702, the user dials up their own computer from the phone. The computer receives the call at 704 and asks for a password in the normal way. At this point, however, the computer connects to the Internet or some other network. This is shown at 706. Once all connections are made, the computer calls back the person on the mobile phone at 708.

At 710, the mobile phone user is provided with a display on their screen of the type shown in FIG. 8. This display can be a simulation of the actual disk layout of the remote computer which is calling the user. Effectively, the display in 710 becomes a remote Explorer. The user navigates on the Explorer to a desired file at 712. For example, the user can find their C: drive, and find an appropriate mail program such as Outlook. Outlook can then be executed to send or receive e-mails.

Once open, the user can write a short note using SMS on their phone, can attach any file of any size to the message, and send a message to the person they are wishing to contact. Since all of the file attachments and all of the high bandwidth operations occur on the remote computer, there is no limitation on the kinds of files that can be manipulated over the phone.

Another alternative shown at 714 allows the user to send the file as a fax. For example, the user can send the file as a fax to the next fax location. This can open a fax program, such as winfax.

Figure 9:
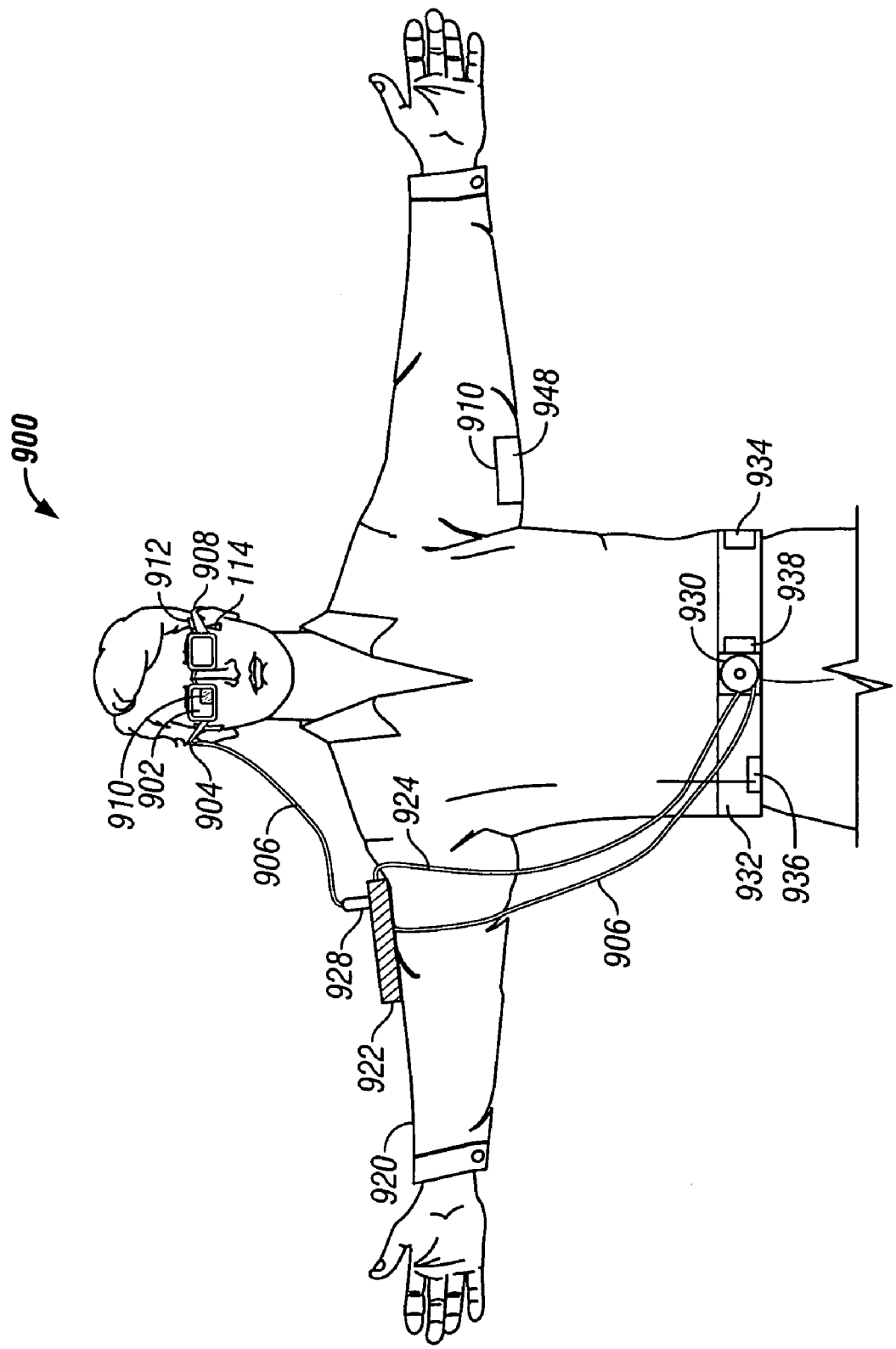
FIG. 9 shows a diagram of a user wired with a wap phone.
Figure 11:
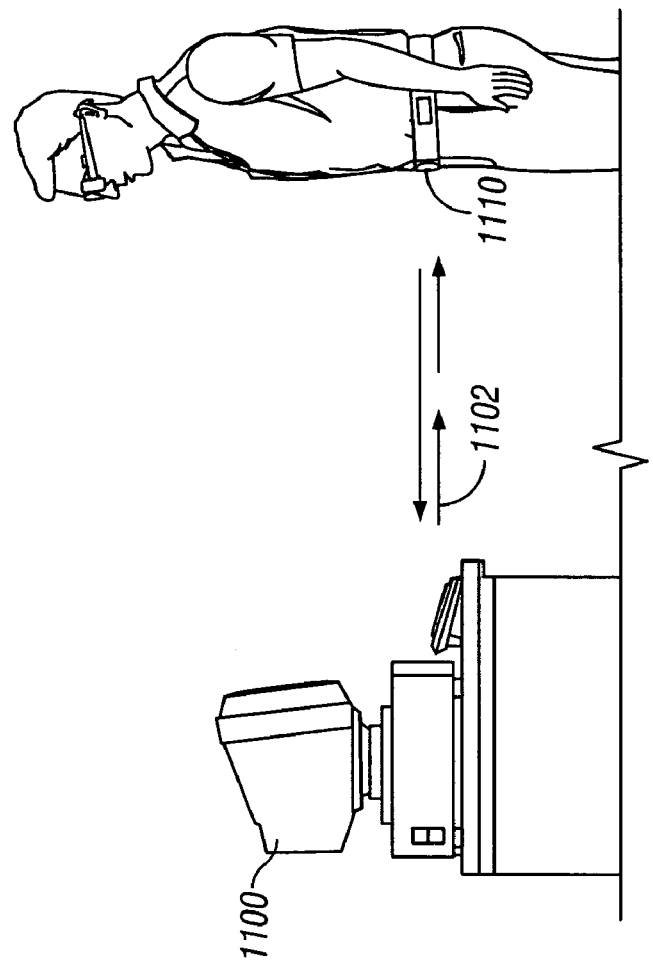
FIG. 11 shows a walk up Internet server.

Another embodiment is shown in FIG. 9. This embodiment relates to forming different parts of a telephone into a user's clothing, effectively defining cell phone fashion. While the present application teaches many different items being embedded into the clothing, any one or multiple ones of these items could be used individually or in combination.

FIG. 9 shows a basic block diagram. The user 900 is shown with the various items of clothing. The user is shown wearing glasses 902 which are cell phone enabled. The glasses include a circuitry portion 904 which is connected to either a wire line 906, or to a Bluetooth or other wireless transmitter 908. Each of the elements disclosed herein can either be connected by wire or by wireless communication. The wires are shown since this would be expected to be the first generation, at least until more advanced wireless communications becomes possible.

The glasses 902 include a screen portion 910 which display content associated with information obtained over the portable telephone. The screen portion 910 can be selectable for example. A bone conduction earpiece 912 can also be associated with the glasses. In addition, a microphone 914 can be aimed toward the user's mouth, or can be extended on an extension pole towards the user's mouth.

The user's garment is also shown as 920. The garment can have solar cells 922 therein accepting sun rays or light, and providing power to the cellular electronics. The communication line 906 may connect to the solar cells, or the solar cells can have a dedicated line shown as 924. The cellular electronics themselves may be on a circuit area 930 which is part of a belt 932 that becomes part of the clothes.

The line 906 between the headpiece and the cellular electronics 930 may be woven into the fabric of the clothing for example. The line 906 may be in two separate portions, including the upper portion 906 from headpiece to a connector 928 that connects to the line 906 going through the garment. The belt 932 is associated with the garment, and the line in the area of the belt may also need to be connected.

The belt can include not only the phone electronics, but also battery packs shown as 934, and other circuitry such as a computer shown as 936. The solar cells 928 can also be connected to the belt to power the circuitry therein and/or to charge the batteries 934. In this way, the clothing itself becomes the connectivity for the phone.

Figure 10:
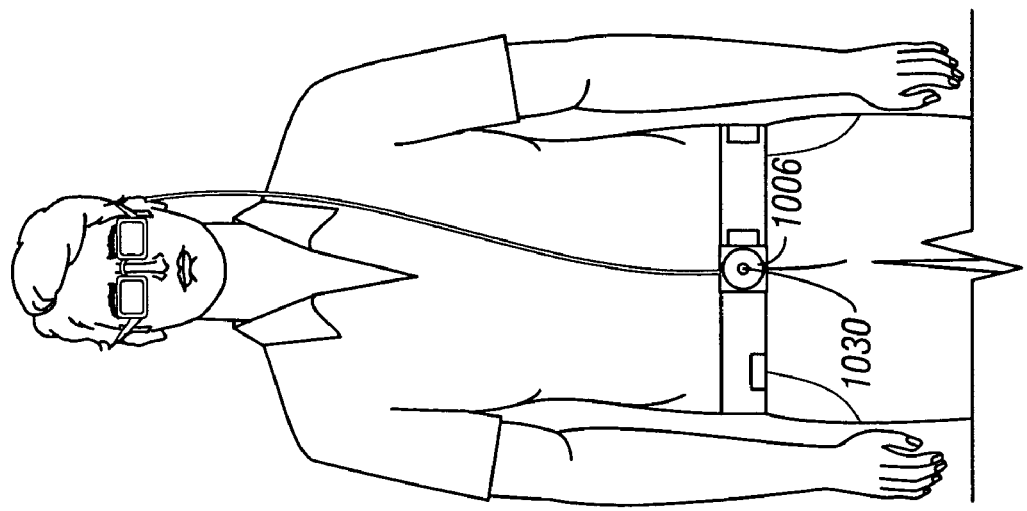
FIG. 10 shows a phone part in a belt buckle.

Another view of the phone and connection is shown in FIG. 10. The phone shown as 130 becomes a large belt buckle as part of the belt. The wires such as 106 are woven through the material of the clothing. The connectivity forms part of the weave.

A number of functions and features become possible with this system. A first embodiment relates to the ability to use this system in conjunction with a wireless cafe. The wireless cafe includes a base station computer 1100 which has some remote control capability. The remote control capability may provide information 1102 by any format of information transfer e.g. Bluetooth or wireless telephone protocol. The computer 1100 may be connected to the Internet, and may have other content associated therewith including, for example, Internet and video. The user with a wireless "clothes" phone approaches the system 1100. The proximity connects the wearer to the wireless cafe using a wireless technology such as Bluetooth or a wireless networking protocol such as wireless Ethernet. The user can carry out more elaborate operations in this way. For example, the user can receive broadband Internet over the wireless pipe or may receive e-mail or other activity. The actual computer remains on the person shown as 1110. However, the source of broadband information comes from the remote computer 1100. The system may bill for connection with a remote computer, for example, as part of the bill for the coffee or other food that is consumed.

The clothing may also include other features. Since cellular telephone technology 930 is included in the telephone, the cellular telephone may itself have position sensing capabilities 938. These positions sensing capabilities may include a wap phone or may include satellite-positioning technologies such as GPS. By registering the clothing with a position sensing system, it becomes possible to trace if the clothing is stolen. This also provides the ability for the user to find where is clothing is. For example, a user may forget that their clothing is at the dry cleaner or has been loaned to a friend. By using the positioning technology, the user can find the location of their clothing.

The clothing can also include a biometric identifier shown as 942. The biometric identifier can, for example, identify the person by their smell or the like. A fingerprint reader or the like could also be provided to prevent or restrict use of the electronics by those other than the registered owner.

In operation, the computer 936 can carry out functions which make it easier to speak and carry out Internet and e-mail over the clothes enabled phone. An exemplary flowchart of operation is shown in 1200. In that figure, the user first speaks to indicate a function they wish to carry out. For example, the user may say "I want to write an e-mail". FIG. 12 shows an e-mail being selected. In a similar way, however, the user can request a new call or any other function of the computer/cellular phone. When the e-mail is selected, the system returns a voice prompt saying "speak for new message". Voice recognition technology is used to recognize the user's speech and allow the user to select recipients of the e-mail and text of the e-mail. The user enters the text and recipients at 1220, and also has an opportunity to edit this text by reviewing it in the display screen, or having the whole information read back to the user through the earpiece. When the user is satisfied, the user initiates the send command at 1225. In a similar way, the user can select calls to be made. The user can use voice to select the recipient of the call whose number is automatically dialed. Incoming calls can be announced to the user through the earpiece 912, including using voice synthesis technology to announce the caller-ID of the incoming caller. The user 900 can answer the phone by speaking simple commands such as send, answer, ignore, voice-mail and the like.

Many high-capacity memory storage media exist. One such media is the CD format. However, the packaging type of the CD format has made it relatively inconvenient. The size of the CD format makes it inconvenient for many applications.

A new CD type format, called the CD card, has recently become available. The CD card is in the size and shape of a business card, and hands is more convenient. Other high-capacity media in more convenient packaging are also available. Without meaning to be exclusive, these media include Sony's memory stick (TM), other many CD formats, and various kinds of smart and flash memory. The packaging of these devices enables them to be distributed much more conveniently.

The present application teaches different applications of these high-performance media.

The present application specifically teaches use of the CD card for providing broadband content, in conjunction with an interactive media.

FIG. 14 shows a CD card. However, through this and all other embodiments, it should be understood that the media used could alternatively be any high-capacity storage media which is in a convenient form to distribute. The card is basically in the shape of a business card, defining an outer perimeter 1300. An inner portion of the card includes the storage portion 1305 which is in standard or CD format. A central spindle portion 1310 may also be provided. Different formats of CD cards are available.

The front portion of the CD card is shown in FIG. 14. This front portion includes identification about the person, such as the person's identifying information. The front portion may also include a bar-code, for example. The bar-code may be used to access a database. As an alternative to the bar-code, optical character recognition parts may be used.

This card front surface 1400 may say "here is Joe Blow", and here's what he's about. This can be read by anyone looking at the CD card, and also can serve as an identifier. The bar-code 1425 can also serve as an identifier.

Figure 15:
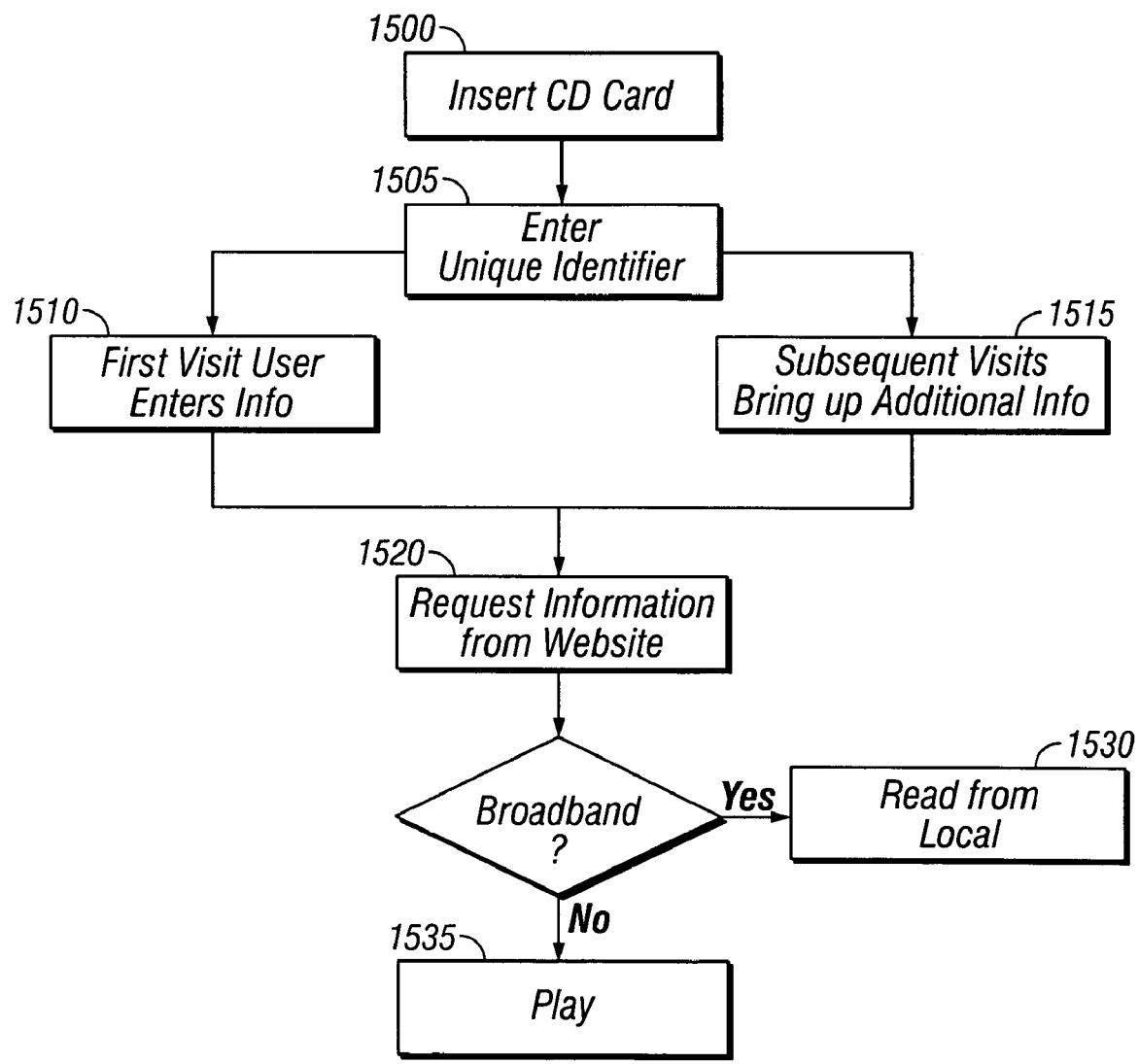
FIG. 15 shows a flowchart of operation of the CD card.
Figure 16:
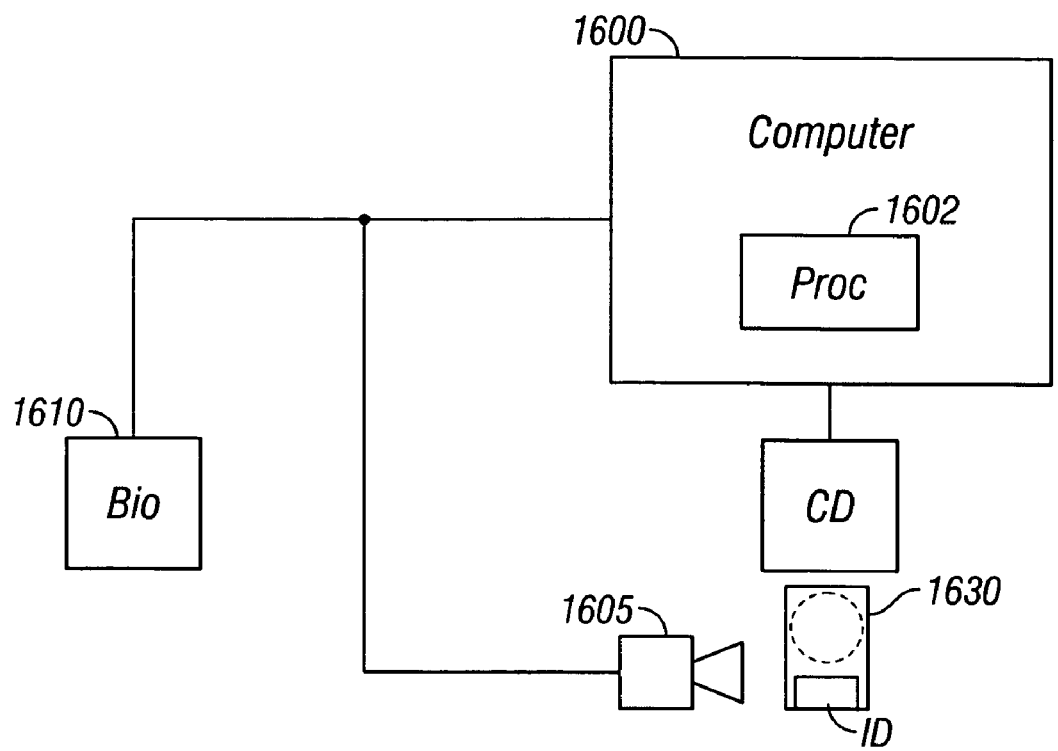
FIG. 16 shows a block diagram of a computer reading the CD card.

In operation, the flowchart of FIG. 15 and hardware of FIG. 16, shows the CD card being inserted into a personal computer at 1500. The operation may be auto play, or may require a user to take some action to run the program on the CD card. Once the program on the CD card is running, a unique identifier is entered at 1505. That unique identifier can be entered in a number of different ways. One way is to scan the bar-code 1425 into computer 1600, using the associated scanner 1605. Other ways of entering the identifier at 1505 may include using cookies. However, since cookies have been lately frowned upon, this may be an ineffective way. Recent versions of e-mail browsing programs and Internet browsing programs may include cookie blockers. The cookie can be formed, if this technique is used, based on the IP address of the user, or any other information.

Another identifier which can be used at 1505 includes a unique error on each card. That error gets associated with the owner of the cards specific details. The error can be introduced manually, or using some other technique. Another identifier can use of biometric detector shown as 1610, associated with the computer 1600. Yet another possible identifier uses the unique processor ID associated with the processor 1602 of the computer 1600. Any of these techniques can be used to form the unique identifier used at 1505. If this is the user's first visit, then at 1510 the user may be asked to enter information about himself. On subsequent visits, the system already knows the information which has been entered. Therefore, the unique identifier brings up the persons additional information on subsequent visits. This is shown as 1515. This enables a unique site or site part to be linked to the unique card. During subsequent parts of the visit to the website, the user may request broadband information. One problem is that many users have only a very slow Internet connection, i.e. a 28.8 connection.

In this embodiment, therefore, the user requests information from the Internet website at 1520. The Internet website determines at 1525 if the information is broadband. The term broadband is of course relative, and can be determined in different ways. For example, the website may determine the user's connection speed, and determined if the desired download will take more than some selectable time e.g. 175 seconds. Alternatively, the website may simply determine if the content is available on the local CD.

In either case, if broadband information is determined, then the broadband part of the information is read from the local CD. If broadband information is not determined, then the non broadband information is obtained from the website. In this way, the information which is displayed to the user may be individualized to the user. The individuality and interaction is caused by the non broadband portions read at 1535. Any broadband portions, which could cause unacceptable delays in receiving the information, are read from the local CD card at 1730.

This system enables a new paradigm of Internet experience. For example, a website could distribute CD cards or other high-capacity media. Upon inserting high-capacity media, the user is directed to the website. Different parts of the website are obtained from the media itself, giving the illusion of broadband information over a low bandwidth line. In addition, different incentives can be provided on the CD card. These incentives can include, for example, coupons if the CD card is bringing up a 3-D shopping experience. The website can be as graphics intensive as desired, since much of the graphics and other broadband content will be stored locally and may be substantially immediately displayed.

Other applications are also described herein which may also used both Internet connection for interactivity, and local high-capacity connection for broadband content. One such application is the use of such a CD card for a remote learning situation. A CD card or other high-performance media can be distributed including different parts of the learning experience thereon. For example, videos and other parts that will be associated with the learning plan may be distributed on the CD card. Other parts, however, are interactive including the control of the CD card. In this embodiment, a special kind of CD card is intended to be used.

Figure 17:
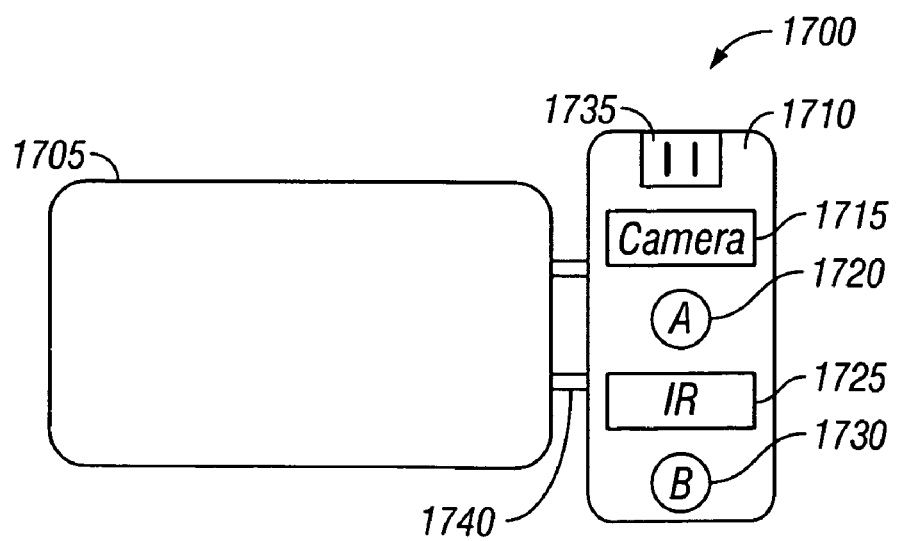
FIG. 17 shows a special two-part CD card with special parts optimized for use in a classroom environment.
Figure 18:
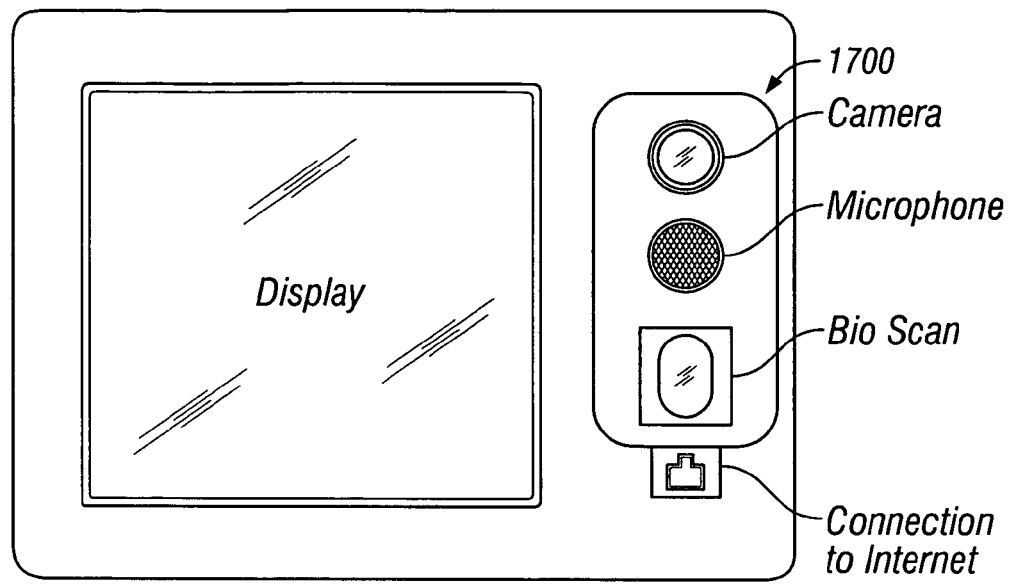
FIG. 18 shows how the second part can be attached to a display.

FIG. 17 shows a special kind of CD card. This is a CD card with a snap off portion 1700. The CD portion 1705 may be of the type previously described, or may be of any other type high-performance media. The snap off portion in this embodiment includes electronics portions 1710. The electronics portion preferably includes a miniature camera portion 1715, a miniature microphone portion 1720 and infrared sensor 1725 and biometric element 1730 which can be for example a fingerprint reader. In addition, a connector 1735. The connector 1735 is optional, and may be replaced by a wireless connection such as an infrared connection, blue tooth connection, or any other type of wireless connection. In operation, the portion 1700 is removed from the CD card by snapping off on the snap off portions 1740. The connecting portion 1700 may include an adhesive peel off back. The unit is connected to the front of the computer using the adhesive peel off back. FIG. 18 shows the unit 1700 attached to the computer monitor.

This system can be used for a secure examination. The user snaps off the attached portion 1700, and attaches it to the Internet connection. The microphone is also attached to the sound card, if necessary. The broadband portion includes the examination, and/or registration software and/or broadband content associated with the instructional program.

Figure 19:
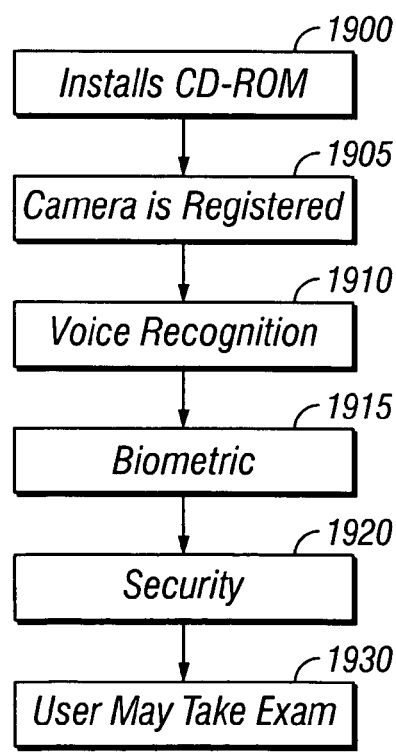
FIG. 19 shows a flowchart of operation of using the special two-part CD card in a classroom environment.

FIG. 19 shows a flowchart of how a student could use this two-part card.

At 1900, the student installs the CD ROM, which begins running a program using the autoplay function on the computer. This causes the student to be taken online and connected to the remote learning institution. Once online, the setup prompt first obtains the student's unique information. This is done using the electronics 1610 better on the associated card part. At 1905, the camera is registered for facial recognition. This can involve taking an initial picture of the user to determine the user's face. The face recognition need not be done automatically, but rather can be done manual recognition by a user at the remote and. At 1910, the microphone is initiated to form voice recognition patterns. At 1915, the user is prompted to use the biometric reader to obtain the user's biometric information, such as a fingerprint.

At 1920, other security measures are carried out. These other security measures may include checking for any other network conductivity on the students computer. Another security measure carried out at 1920 can include looking for other persons in the room using the infrared sensor. By obtaining an infrared fingerprint of the room's configuration, the presence of other people can be determined. Keyboard typing pattern recognition can also be carried out as part of the security.

Once all the security measures are complete, the user may begin taking the exam at 1930. The exam may include portions from the CD itself, e.g. broadband information from the CD. The exam may also include remote online questions which are interactively provided to the user. Some questions may require voice only answers which are then sent to the remote and via the microphone. Questions may also require that the user register first with a fingerprint check before each question. Therefore, the question process may include the user pressing their finger up against the biometric sensor 1630, receiving a question, and providing an answer. In between receiving the question and providing the answer, the infrared sensor monitors for excessive movement.

At all times during the examination, the software can continue checking security including facial recognition, typing pattern recognition, voice recognition, network conductivity, and other people in the room. Depending on the specific situation, the system may also issue a challenge at any time if any of the aspects exceed predetermined parameters. For example, if too much motion is detected in the room, then the user may be required to re-enter their fingerprint or speak for voice recognition.

This system may also be used with alternative devices such as a biometric mouse. Biometric mice may include thumb print readers. If the biometric mouse solution is used, then a user would be expected to enter their fingerprint before answering each question.

Figure 20:
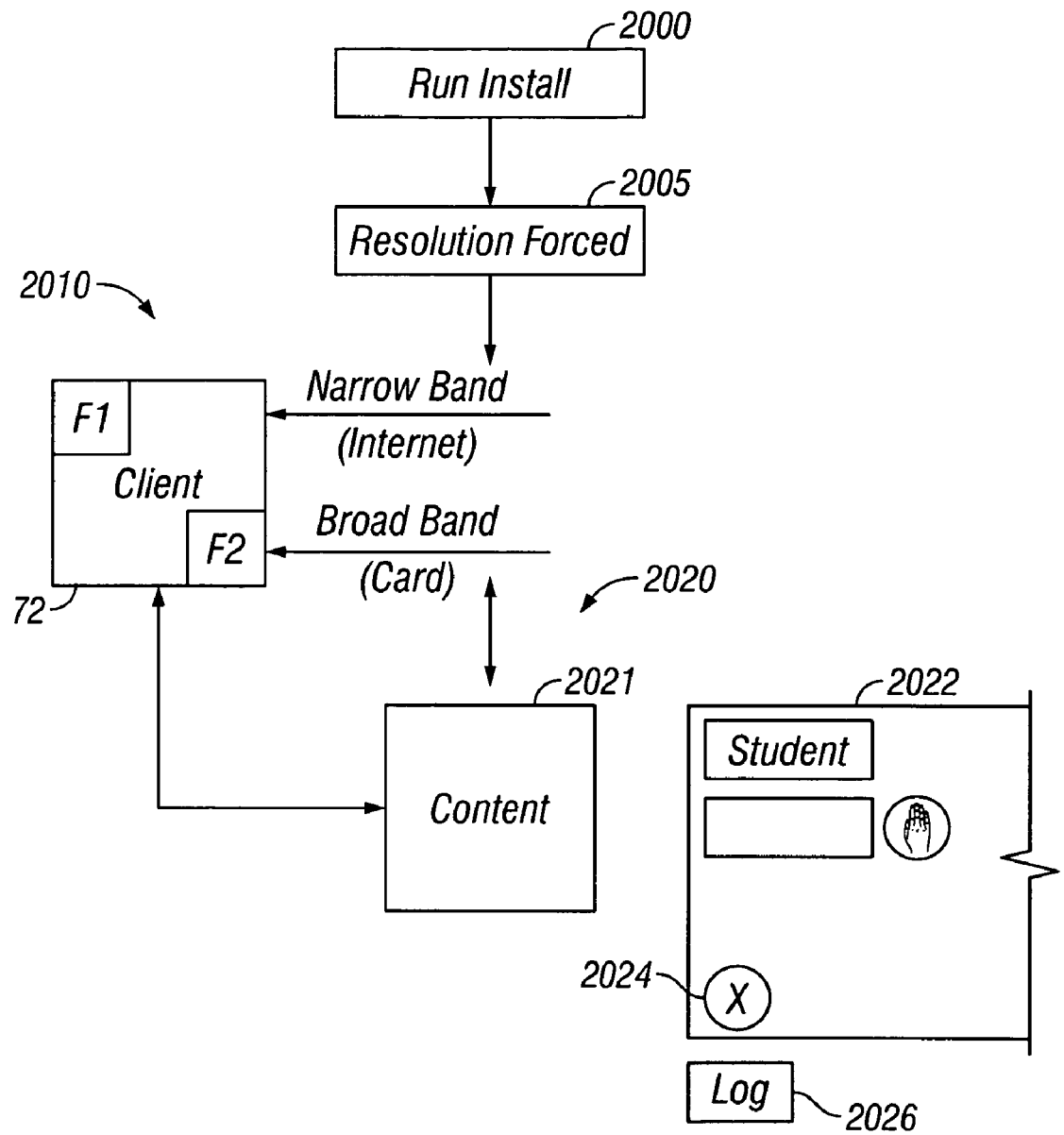
FIG. 20 shows a flowchart of how a classroom environment may be carried out.

The above has described use of the CD card in an examination situation. The CD card can also be used as an instructional program, however. The instructional video is stored on the CD card shown in FIG. 20. Upon running the instructional program at 2000, other remote users resolution may force to a certain level for example 800 by 600 resolution at 2005. The program is then run at 2010 to bring up a specified screen on the client, which includes narrowband information obtained via the Internet or other network connection, and broadband information from the card itself. The client screen is based on the program which is running on the CD card. The server also runs a specified program shown as 2020. The server preferably operates using two separate display screens. A first display screen 2021 shows the content which is being displayed on each of the clients. This first display screen 2021 can be adjusted by the instructor. The second display screen 2022 shows a list of all students who are online at the specified time. The students may go on an off-line periodically, but the list is kept up-to-date using the software running in the client computers.

During the time of instruction, the local mouse is locked out. That means that the client is preferably prevented from using his local mouse. However, the function keys to remain enabled. The different function keys may be assigned to different functions, and these functions which are allowed at any specified time may also be displayed on the client screen. For example, the function key F1 effort one may be associated with the user at the client requesting to ask a question. When the F1 key at the client is actuated, an indication is sent to the second screen indicating that the specified student has asked a question. The instructor can stop and answer the question. If any instructor decides to answer the question at that time, the instructor can give control to the student who has asked the question. The student who asks the question is biometrically identified. All students then see that student asking the specified question. The content screen 2021 shows the specified student. The teacher can also take control back at any time, or alternatively can send a private message to the client indicating that the instructor will contact the student later to answer the question off-line. If this happens, then this system stores a log shown as 2026 which indicates which student asked the question and at what time the question was asked. One other option allows the teacher to take control of only one computer, and discuss the specified question with the user at that one computer while other users do different work. The other users may do work such as watching broadband content from the system. Since the local mouse and other controls of the client are locked out during this time, the F12 key may be allowed to stop control of the client by the program, and enable the client to retake control. When F12 is pressed, a time stamp is sent to the client indicating the time when the specified client locked out. This may also be logged so that the instructor can determine which students were on at what times.

The teacher's sound and voice can be obtained via a camera and microphone, and seem on both the content screen 2021 and the client screen 2012 using standard Internet voice and vision over IP techniques.

Preferably, the CD card instructional information includes its own Internet browser. This requires, therefore, that all students have the same Internet browser and are kept in sync at all times. A sync button 2224 on the instructor's computer can force synchronization at anytime. The teacher can also use yet another computer, thereby logging and as a client to make sure that synchronization is maintained.

Another problem related to examination over the Internet is identification. This system described above may operate adequately over the Internet, but requires a large investment in hardware. The biometric system described above can enable not only examination taking, but also a virtual campus to be entered. This virtual campus can allow instructional studies, such as allowing the user to enter any ongoing virtual class at anytime. It may also allow the users to buy supplies automatically at specified student discounts. Since this system already has biometric identification information, this buying of supplies can automatically access the student's account.

The basic idea of the clip off portion can be used for other functions as described. The FIG. 18 device shows a biometric in line connector. One connector 800 goes to the computer, the other connector 810 goes to a phone or other socket for Internet connection. By playing the software on the CD Rom 1705 that was attached to the portion, the user is taken to a registration area which registers the user as described above using any of the techniques described above. The user enters their details, and also enters their biometric information. Once registering in this way, the user can later use the system to make purchases.

Another embodiment is an application of the CD card. For example, the CD card may be used for 3-D shopping as described above. The 3-D shopping technique may include rewards associated with buying certain items.

The CD card may include free Internet service provider (ISP) software thereon. The user inserts the CD card and immediately obtain access to the ISP software. As part of the use of the ISPs software, however, the user is required to use a specified shopping community by a certain amount. Each time the user enters the CD card into this system, the unique ID is used to identify the user. The ISP operation is allowed to continue as long as the user has used the community by a certain amount.

Another embodiment, using a bar-code, enables the CD card to be used for a conference such as a technical conference. Information about the conference can be stored on the CD card. The bar-code on the CD card enables taking attendance to determine who has attended the conference. Certain information about the conference can also be obtained.

Although only a few embodiments have been described in detail above, other modifications are possible.

What is claimed is:
1. An apparatus comprising:
a pair of glasses, including eye portions intending to cover a user's eyes, including a frame with ear portions extending towards the user's ears;
a listening portion, coupled to said ear portions of said frame and playing audio responsive to an applied signal, wherein said listening portion comprises a bone conduction part that causes sound to be produced and conducted directly to a bone that is near said portion;
a speaking portion, coupled to said frame, and including a microphone positioned in a location to receive spoken audio; and
a wireless connection part, coupled to said listening portion and said speaking portion, receiving a signal indicative of spoken audio from said speaking portion, and providing said applied signal to said listening portion;
an interface in said cellular telephone transceiver, which enables an oral command of functions associated with the cellular telephone via said speaking portion, wherein said oral command includes a command to send an email via said cellular phone transceiver;
a cellular phone part including a connection to said wireless connection part, and allowing receiving audio from said speaking portion and sending audio to said listening portion via said cellular phone part and
a solar cell coupled to a user's belt, providing power.

* * * * *